US009064468B2

(12) United States Patent
Glen (10) Patent No.: US 9,064,468 B2
(45) Date of Patent: Jun. 23, 2015

(54) DISPLAYING COMPRESSED SUPERTILE IMAGES (75) Inventor: David Glen, Toronto (CA)

(73) Assignee: ATI Technologies ULC, Markham (ON) (CA)

( * ) Notice: Subject to any disclaimer, the term of this patent is extended or adjusted under 35 U.S.C. 154(b) by 784 days.

(21) Appl. No.: 13/186,160

(22) Filed: Jul. 19, 2011

(65) Prior Publication Data

US 2012/0162250 A1 Jun. 28, 2012

Related U.S. Application Data (60) Provisional application No. 61/365,706, filed on Jul. 19, 2010.

(51) Int. Cl.
G09G 5/399 (2006.01)
G09G 5/36 (2006.01)
G06T 15/00 (2011.01)
G06T 1/60 (2006.01)
G06T 1/20 (2006.01)
G06T 9/00 (2006.01)
H04N 19/59 (2014.01)

(52) U.S. Cl.
CPC .............. G09G 5/363 (2013.01); G06T 15/005 (2013.01); G06T 1/60 (2013.01); G09G 2340/02 (2013.01); G09G 2360/06 (2013.01); G09G 2360/122 (2013.01); G06T 1/20 (2013.01); G06T 9/00 (2013.01); H04N 19/59 (2014.11)

(58) Field of Classification Search
None
See application file for complete search history.

(56) References Cited

U.S. PATENT DOCUMENTS

| 7,075,541 | B2 | 7/2006 | Diard |
| 7,383,412 | B1 | 6/2008 | Diard |
| 7,613,346 | B2 | 11/2009 | Hunkins et al. |
| 8,154,556 | B1 * | 4/2012 | Riach et al. ................... 345/540 |
| 2004/0100471 | A1 | 5/2004 | Leather et al. |
| 2009/0118017 | A1 * | 5/2009 | Perlman et al. ................. 463/42 |
| 2009/0295816 | A1 * | 12/2009 | Kallio ........................... 345/553 |
| 2010/0085365 | A1 * | 4/2010 | Campbell et al. ............. 345/502 |

OTHER PUBLICATIONS

International Search Report and Written Opinion, dated Dec. 20, 2011, for PCT Appl. No. PCT/IB2011/002209, 8 pages.

* cited by examiner

Primary Examiner — Kimbinh T Nguyen
Assistant Examiner — Raffi Isanians
(74) Attorney, Agent, or Firm — Volpe and Koenig, P.C.

(57) ABSTRACT

A method for the display of compressed supertile images is disclosed. In one embodiment, a method for displaying an image frame from a plurality of compressed supertile frames includes: reading the compressed supertile frames; expanding the compressed supertile frames; and combining the expanded supertile frames to generate the image frame. The expanding can include generating an expanded supertile frame corresponding to each of the compressed supertile frames by inserting blank pixels for tiles in the expanded supertile frame that are not in the corresponding compressed supertile frame. Corresponding system and computer program products are also disclosed.

16 Claims, 5 Drawing Sheets

DISPLAYING COMPRESSED SUPERTILE IMAGES

CROSS REFERENCE TO RELATED APPLICATIONS

This application claims the benefit of U.S. provisional application No. 61/365,706, filed on Jul. 19, 2010, which is hereby incorporated by reference in its entirety.

BACKGROUND

1. Field

Embodiments of the present invention are related to reducing memory consumption in the display of images.

2. Background Art

Some graphics processing systems include multiple processing units, such as graphics processing units (GPUs), to allow for performance gains through parallel processing of graphics tasks. For example, a graphics-intensive game may be running that requires, or can benefit from, having the additional processing power provided by using multiple GPUs.

The multiple GPUs that are available in the system are used in several ways, including to process alternate frames that are being rendered (i.e. alternate frame rendering), or to process parts of the same frame. For example, when a frame requires complex processing that can be efficiently handled by both GPUs of a two GPU system concurrently processing the same frame, the CPU can distribute the same frame to both GPUs.

In some graphics processing modes, such as when multisampling is enabled, the memory footprint required for processing a frame in each GPU is substantially increased. For example, when multisampling or super sampling is used, each pixel of a frame may include multiple samples, thus significantly increasing the size of the frame data that is stored in GPU memory. The increase in the required memory footprint can lead to performance degradations due to scalability limitations, bandwidth limitations, and delays in rendering frames.

What is needed, then, are methods and systems that reduce the memory footprint required in each processor to process a frame.

BRIEF SUMMARY OF EMBODIMENTS OF THE INVENTION

Embodiments of the present invention enable the display of compressed supertile images. In one embodiment, a method for displaying an image frame from a plurality of compressed supertile frames includes: reading the compressed supertile frames; expanding the compressed supertile frames; and combining the expanded supertile frames to generate the image frame. The expanding can include generating an expanded supertile frame corresponding to each of the compressed supertile frames by inserting blank pixels for tiles in the expanded supertile frame that are not in the corresponding compressed supertile frame.

Another embodiment is a system for displaying an image frame from a plurality of compressed supertile frames of the image frame. The system includes a control processor, a plurality of graphics processing units coupled to the control processor, and a supertile frame combiner. Each graphics processing unit is configured to process one or more of the supertile compressed frames. The supertile frame combiner is configured to, read the compressed supertile frames, expand the compressed supertile frames, and combine the expanded frames to generate the image frame.

Yet another embodiment is a computer readable media storing instructions wherein said instructions when executed are adapted to display an image frame from a plurality of compressed supertile frames with a method comprising: reading the compressed supertile frames; expanding the compressed supertile frames; and combining the expanded supertile frames to generate the image frame.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use embodiments of the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS OP THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Figure 1:
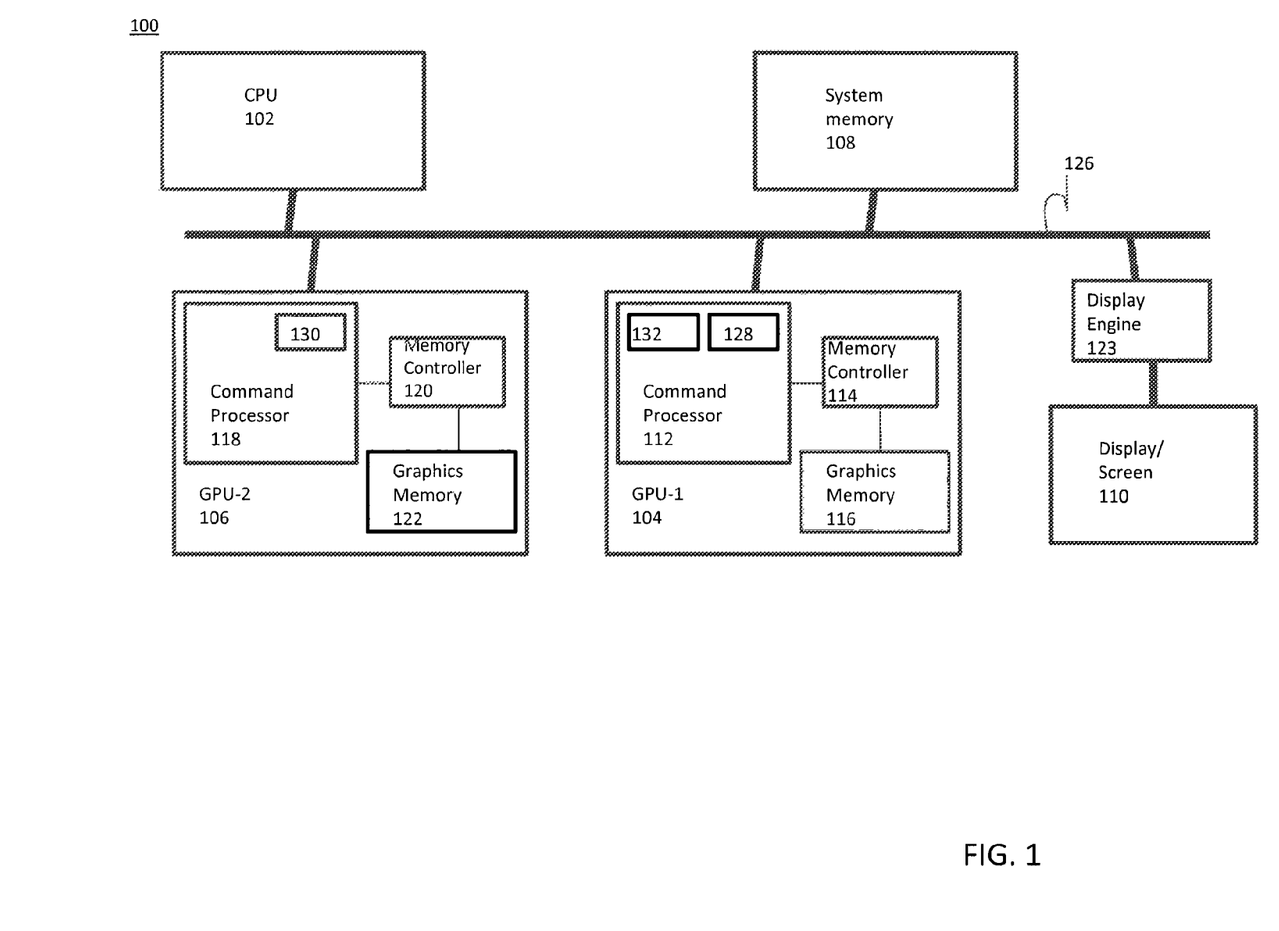
FIG. 1 shows a block diagram of a graphics computing environment, according to an embodiment of the present invention.

Graphics systems having multiple processing units, such as multiple graphics processing units (GPU), can provide enhanced performance over systems with a single GPU by allowing some graphics operations to be executed in parallel. The multiple processing units can comprise a GPU, general purpose GPU (GPGPU), CPU, combinations thereof or any other processor capable of processing image data as described herein. FIG. 1 shows a multi-GPU computing environment according to an embodiment of the present invention. For example, computing environment 100 includes a central processing unit (CPU) 102 coupled to GPUs 104 and 106. As would be appreciated by those skilled in the relevant art(s) based on the description herein, although a two GPU embodiment is illustrated in FIG. 1, embodiments of the present invention can include any number of GPUs. Each GPU 104 and 106 may be coupled to additional components such as memories, displays, etc. GPUs 104 and 106 receive graphics related tasks, such as graphics processing (e.g., rendering) or display tasks, from CPU 102. As will be understood by those of ordinary skill in the art, GPUs 104 and 106 may be, as illustrated, discrete components (i.e., separate devices), integrated components (e.g., integrated into a single device such as a single integrated circuit (IC), a single package housing multiple ICs, integrated into other ICs—e.g., a CPU or a Northbridge) and may be dissimilar (e.g., having some differing capabilities such as, for example, performance).

GPU 104 includes components such as a command processor 112, a memory controller 114, and a local graphics memory 116. Command processor 112 controls the command execution on GPU 104. For example, command processor 112 can control and/or coordinate the receiving of commands and data from CPU 102 to be processed in GPU 104. Command processor 112 can also control and/or coordinate allocation of memory in graphics memory 116, for example, through memory controller 114. Memory controller 114 can control access to graphics memory 116 for the reading and writing of data.

In a manner similar to GPU 104, GPU 106 can include a command processor 118, memory controller 120, and a graphics memory 122. The functionality of command processor 118, memory controller 120, and graphics memory 122 are similar to that of the corresponding devices 112, 114, and 116 in GPU 104 described above.

Computing environment 100 also includes a system memory 108. System memory 108 can be used for holding the commands and data that are transferred between GPUs 104 and 106 and CPU 102. After the data is processed using graphics operations, the processed data can be written back to system memory 108 from GPU 104 and 106. For example, in some embodiments, processed data from graphics memory 116 can be written to system memory 108 prior to be being used for further processing or for display on a screen such as screen 110. In some embodiments, frame data processed in GPU 104 and/or 106 is written to screen 110 through a display engine 123. Display engine 123 can be implemented in hardware and/or software or as a combination thereof, and may include functionality to optimize the display of data to the specific characteristics of screen 110. In another embodiment, display engine 123 can receive processed display data directly from GPU memory 116 and/or GPU memory 122.

The various devices of computing system 100 are coupled by a communication infrastructure 126. For example, communication infrastructure 126 can include one or more communication buses including a Peripheral Component Interconnect Express (PCI-E) bus, Ethernet, FireWire, and/or other interconnection device. In an embodiment, communication infrastructure 126 can include an interconnection device coupling two or more GPUs to each other.

In embodiments of the present invention, the allocation of sets of tiles from an image frame to a plurality of processors is referred to as supertiling. A set of tiles from the original image frame allocated to a processor is referred to as a supertile frame. Each GPU can also include logic to determine the memory allocation to be made in its local memory based on the tiles to be processed in the supertile frame assigned to it. For example, GPU 104 includes tile compaction logic block 128 and GPU 106 includes tile compaction logic block 130. Each tile compaction logic block can include the functionality to determine the required memory allocation for the tiles assigned to the respective GPU, to coordinate the storage of the tiles in the respective local memories according to the teachings of the present invention, and to determine the logical layout of tiles within the respective graphics memories, according to an embodiment of the present invention.

In an embodiment, one or more of the GPUs 104 or 106 can also include supertile frame combination logic block 132. Supertile frame combination logic block 132 includes logic to combine the tiles that are processed separately in multiple GPUs into a single frame that can be displayed on a screen or that can be transferred to system memory. In some embodiments, supertile frame combination block 132 can access local memory 116 of its own GPU 104 as well as local memory 122 of GPU 106 to retrieve tiles processed at each GPU separately. According to an embodiment, supertile frame combination logic block 132 includes functionality to expand one or more compressed frames (also referred to as compressed supertile frames) into a full resolution frame by inserting unused pixels (also referred to as 'blank pixels') in the locations of tiles not allocated to the respective GPU. Supertile frame combination block 132 may, in yet other embodiments, retrieve and export compressed frames from respective local memories of GPUs such that the frame can be displayed without first having to reconstitute the entire frame in a contiguous memory. It should be noted that the supertile frame combination logic block 132 and/or its functionality can be implemented within at least one of the GPUs 104 or 106, or externally to both the GPUs. For example, in an embodiment, supertile frame combination logic block 132 can be implemented in display engine 123. In another embodiment, supertile frame combination logic block 132 can be implemented in the rasterizer operations (ROP) logic of a GPU.

In the description above, GPUs 104 and 106 are depicted as including selected components and functionalities. A person skilled in the art will, however, appreciate that one or both GPUs 104 and 106 can include other components such as, but not limited to, shader engines.

Figure 2:
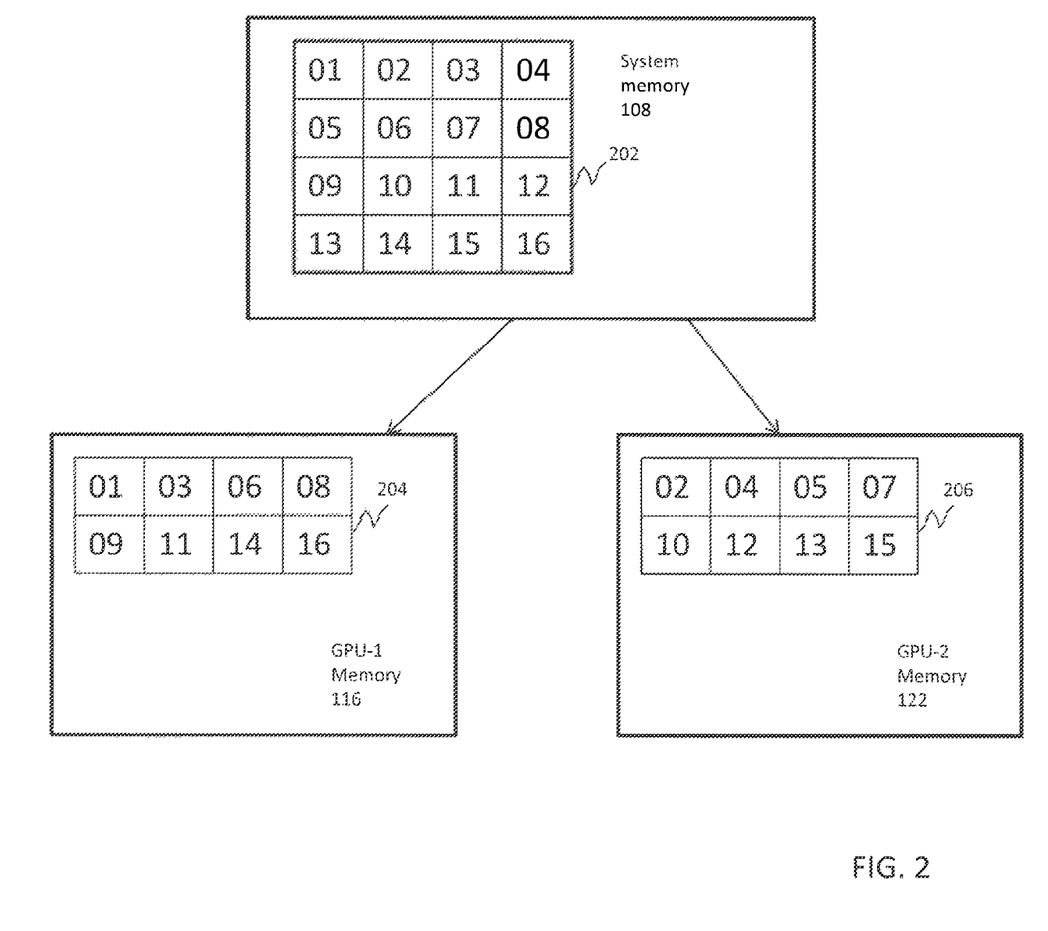
FIG. 2 shows an example tiling of an image frame and an example assignment of supertile frames to processors, according to an embodiment of the present invention.

FIG. 2 illustrates an example assignment of tiles of an image frame to two GPUs, and an example of the layout of corresponding tiles in the local memory of each GPU local memory. For example, frame 202 can contain an image to be rendered by GPUs 104 and 106 on to screen 110. Each small rectangle within frame 202 represents a tile. A tile can be a rectangle of any dimensions, but commonly used tile sizes are 16×16 pixels and 32×32 pixels. A frame divided to tiles, such as frame 202, is referred to as a tiled frame. In the embodiment shown, CPU 102 assigns the tiles of frame 202 in a checkerboard pattern with each alternate tile being assigned to graphic memory 116 of GPU 104 and the rest of the tiles to graphic memory 122 of GPU 106. As described previously, each GPU is assigned a supertile frame comprising a plurality of tiles to be processed from image frame 202.

The pattern of tile assignment may be based on various factors including the mode of display. For example, if the ultimate display of the frame 202 on screen 110 would be executed by progressively displaying tiles in a left to right and top to down pattern, then it may be advantageous to assign alternate tiles to each GPU so that the work load is balanced between the GPUs in terms of the number of tiles assigned, as well as the spatial distribution of the assigned tiles.

FIG. 2 also illustrates an example of how the tiles of a frame assigned to each

GPU can be logically arranged in the graphic memories 116 and 122 of GPUs 104 and 106, respectively. Tiled image fame 202 in system memory 108 is shown having 16 tiles. Frames having a different size of tiles and/or different number of tiles are possible. The tiles are illustrated with numbers ranging from 01-16 so that the example pattern of assignment can be conveniently shown. In the example shown, tiles are assigned in a checkerboard pattern to the two GPUs. Other patterns of assigning tiles to respective GPUs are possible. Memory area 204 in graphics memory 116 in GPU 104 can have the tiles assigned to GPU 104 arranged in the manner shown (corresponding tile numbers in the range of 01-16 shown in memory areas 202, 204 and 206 represents copies of the same tile). As shown, the tiles may be arranged in a rectangular grid in a left-right top-down manner corresponding to the order of the respective tile's appearance in frame 202 among those tiles assigned to GPU 104. Likewise, memory area 204 in graphics memory 116 in GPU 106 can have the tiles assigned to GPU 106 arranged in the manner shown. The tiles allocated to each GPU are stored in the corresponding GPU memory in the form of a compressed frame so as to minimize the memory footprint, for example, by only allocating memory space to store the assigned tiles and not allocating space for any unassigned tiles. In the example shown, by storing only the tiles assigned to that GPU in each graphics memory, the memory footprint required for the frame in each graphics memory is reduced to about half of the footprint required to store the entire frame. Moreover, by only storing assigned tiles in its graphics memory, each GPU avoids the processing of unassigned tiles.

Figure 3:
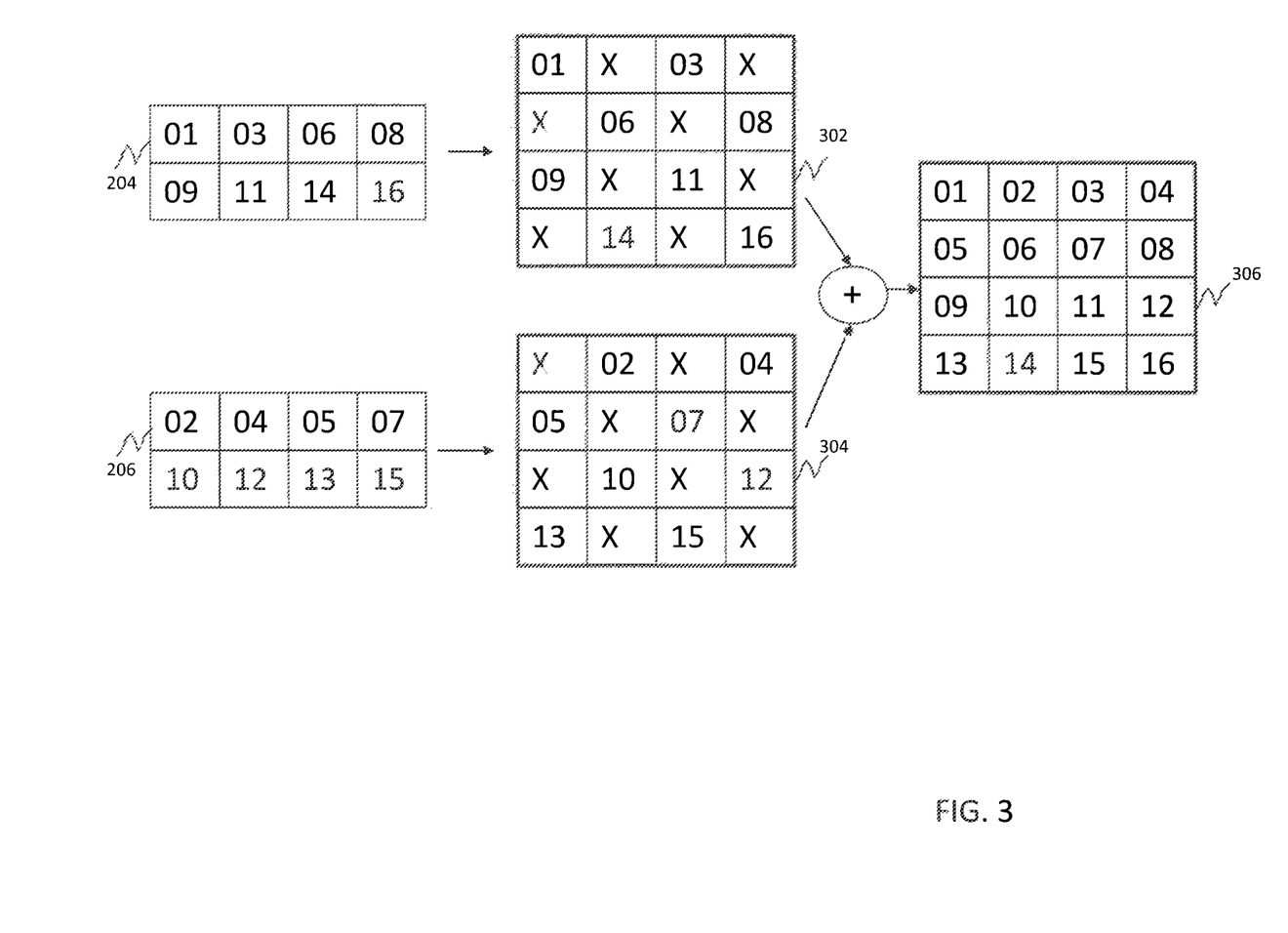
FIG. 3 shows an example expansion of compressed frames assigned to each processor, according to an embodiment.

FIG. 3 graphically illustrates aspects of the process of blending compressed frames to generate a full resolution frame according to an embodiment of the present invention. As shown in FIG. 2, tiles from tiled frame 202 are assigned to separate GPUs and are stored in the respective GPU memories as compressed frames 204 and 206. Compressed frames 204 and 206, originally illustrated in FIG. 2, are shown again in FIG. 3. Compressed frames 204 and 206 are expanded, respectively, to uncompressed frames (also referred to below as "expanded frames" or "expanded supertile frames") 302 and 304 that each include the tiles allocated to the corresponding GPU. Each tile illustrated with a number in expanded frames 302 and 304 represent the corresponding tile from the respective compressed frame. Each tile marked with an 'X' in frames 302 and 304 represent inserted blank pixels in accordance with an embodiment of the present invention, Expanded frames 302 and 304 with inserted blank pixels are combined (also referred to as "blended") to generate the final combined full resolution frame 306 containing all the tiles of tiled frame 202 processed at respective GPUs. Combined full resolution frame 306 can subsequently be displayed on a screen.

Figure 4:
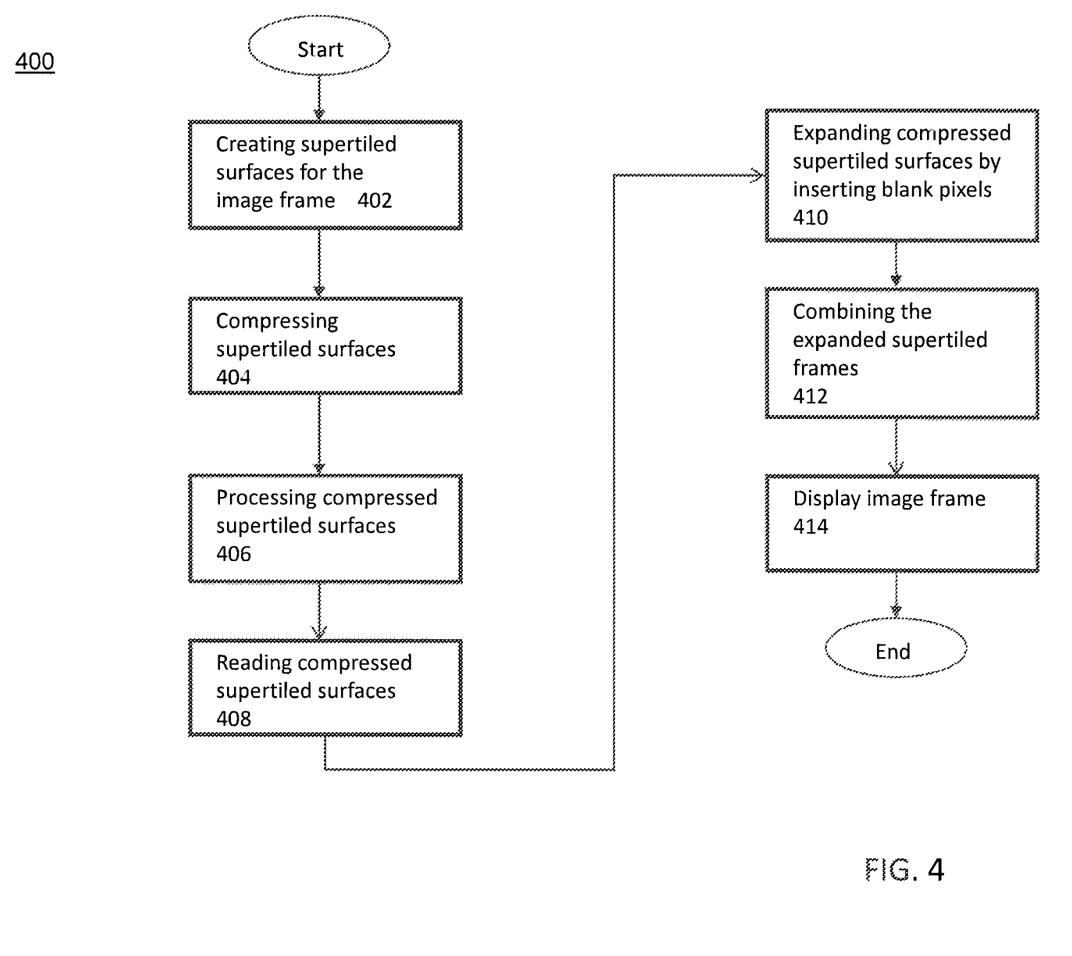
FIG. 4 is a flowchart illustrating the processing of an image frame in a multi GPU system, according to an embodiment of the present invention.

FIG. 4 is a flowchart of a process that enables a frame to be processed by multiple GPUs, according to an embodiment of the present invention. In operation 402 a tiled frame is created corresponding to an image to be rendered. A tiled frame, according to an embodiment, is a frame that is divided into a plurality of tiles in such a manner that the entire frame (or display area) is covered by tiles. The tiles are usually 16×16, 32×32 or 64×64 pixels in size. The subsequent processing, memory access, etc., of the frame can be based on individual tiles. According to an embodiment, a tile can be identified within a frame by the position of its top left pixel.

According to an embodiment, the frame that is subjected to tiling comprises rasterized data with one or more fragments for every pixel position on the display to which a corresponding image is to be rendered. The pixels and/or pixel fragments of the rasterized frame can be the output of one or more shader programs such as vertex shaders, geometry shaders, and/or pixel shaders. The shader programs typically process quads, or blocks of 2×2, of pixels. The output of the shaders can be processed by a ROP Which performs functions such as color combining and antialiasing before the blocks are written to an output buffer. The ROP can operate on the output buffer to define a tiled frame, In step 404, sets of tiles are allocated to a plurality of processors. For example, every alternate tile of the tiled frame starting with the top left tile can be allocated to GPU-1 104 and the rest of the tiles can be allocated GPU-2 106. Such an allocation of supertile frames to GPU-1 and GPU-2 is shown in FIG. 2. As shown in FIG. 2, each processor compresses the supertile frame allocated to it before storing it in its memory by storing only the tiles allocated to it. The frame stored in each GPU is a compressed supertile frame. Lu an embodiment, compression is accomplished by maintaining a list or a predetermined pattern identification that defines the tiles allocated to respective processors, and storing the allocated tiles within contiguous memory in the respective processor.

In step 406, each processor performs any required processing upon the tiles allocated to it. Such processing, for example, can include processing by one or more shader programs. In an embodiment, when each processor has completed the processing of the tiles allocated to it, a signal may be sent from the respective processors to a component that coordinates the reassembling of the separately allocated tiles to form a frame. For example, a message packet can be sent, a register value can be set, and/or a hardware signal can be asserted.

In step 408, the compressed supertile frame in each respective processor is read. In an embodiment, a graphics driver or other logic receives the signal from each processor that it has completed the processing of the allocated tiles. The graphics driver or other logic can then proceed to retrieve the compressed frame from the memory of each processor. In an embodiment, the logic to receive and combine the compressed frames is implemented in the supertile frame combination logic block 132.

In step 410, the compressed frames retrieved from respective processors are uncompressed to create a corresponding expanded frame. Logic to read and combine compressed frames can read the compressed frame from the graphics processor memory and expand it while writing to a buffer, for example, in system memory or in a graphics memory. According to an embodiment, the reading of the compressed frame can be performed tile by tile. In another embodiment, the entire compressed frame can be requested.

In an embodiment, an expanded frame (also referred to as an "expanded supertile frame") is constituted from each respective compressed frame by re-inserting blank tiles for each tile not assigned to that processor. A blank tile (i.e. a tile marked as not containing valid data) can be constituted of pixels defined as pixels without valid content ("blank pixels"). In an embodiment, blank pixels are pixels with a 0 value. Blank pixels having a value of 0 are also referred to as "black pixels." In another embodiment, the blank pixels and/or blank tiles can be marked in any manner that permits convenient combination of the expanded frames corresponding to the respective compressed frames.

In step 412, the expanded frames with processed tiles are combined to form a combined full resolution frame. According to an embodiment, the combining or blending is accomplished through executing an add operation on respective expanded frames. Because, for each tile position only one expanded frame would have a non-blank tile value, an add operation combining the frames results in a combined full resolution frame in which each tile is a processed tile. In an embodiment, by replacing each blank pixel with a black pixel (i.e., pixel with a value of 0) before performing the add operation, a combined full resolution frame is obtained where the value of each pixel of the fall resolution frame is its processed value.

In step 414, the combined full resolution frame constructed in step 412 can be displayed or used for another purpose, such as, for example, to be stored digitally.

Figure 5:
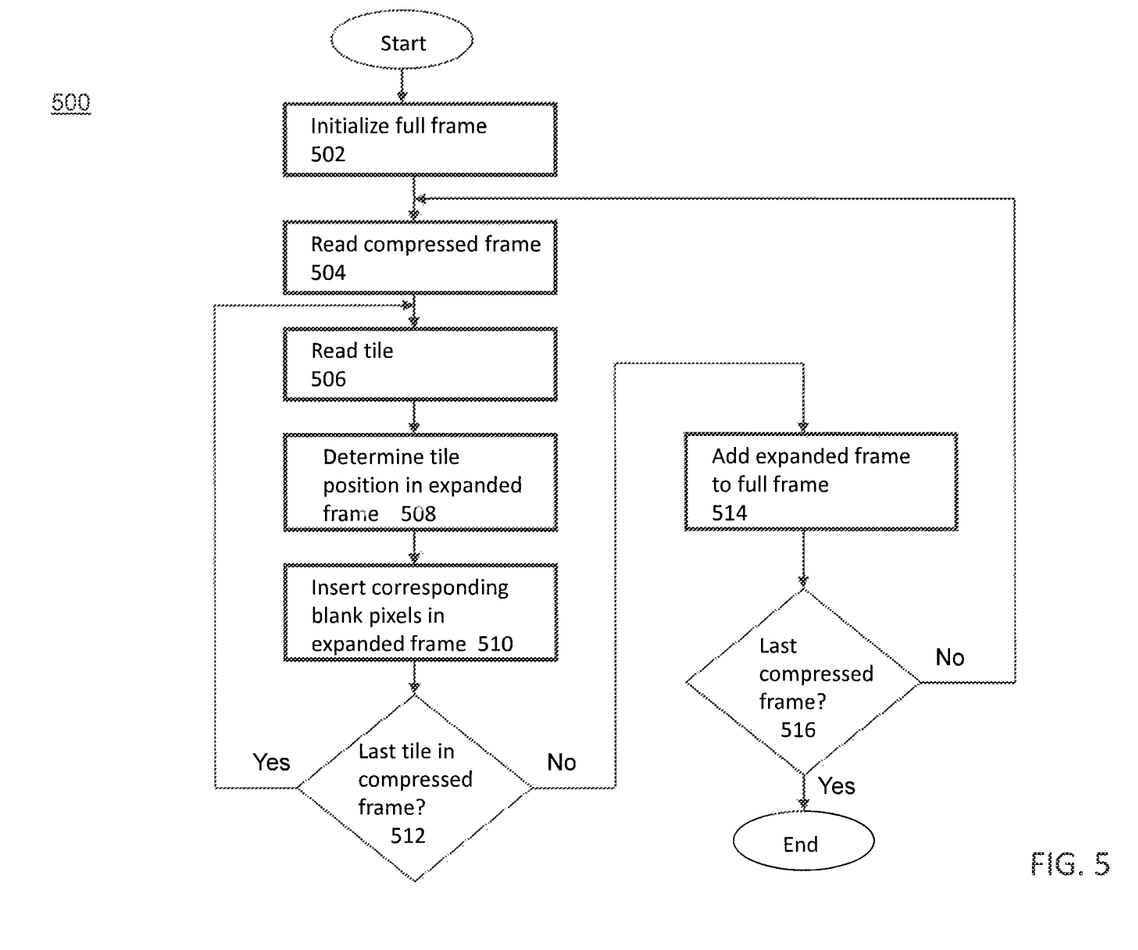
FIG. 5 is a flowchart illustrating the combining of compressed supertile frames, according to an embodiment of the present invention.

FIG. 5 illustrates a method 500 to constrict a combined full resolution frame from multiple compressed frames, according to an embodiment. In step 502, a memory buffer is initialized to hold the combined full resolution frame. The memory buffer can be a frame buffer, a memory area in a graphics memory, or a memory in a system memory area.

In step 503, a memory area is initialized to hold an expanded frame to be constructed based on a compressed frame. The expanded frame memory area can be re-initialized and re-used for each compressed frame to be expanded. The expanded frame memory area can be in a system memory, graphics memory, or other memory.

In step 504, a compressed frame is read from a memory. A compressed frame can be stored in a graphics memory corresponding to a respective processor as described in relation to step 404 above. Reading of the compressed frame from the corresponding graphics memory can be based on reading tiles individually, on reading the entire frame with a single read instruction, or on reading intermediate sizes of memory. Upon reading, the compressed frame and/or part thereof can be written to system memory or a graphics memory.

In step 506, a tile from the last read compressed frame is read. In each invocation of step 506 in processing the last read compressed frame, tiles from the last read compressed frame can be read in sequence starting at the top left corner of the compressed frame and proceeding in a left-right top-down pattern.

In step 508, the position of the tile within the expanded frame is determined. According to an embodiment, the position of the tile within the expanded frame can be determined based on the pattern of tile allocation to respective processors. In another embodiment, each tile can have encoded in it its position in the expanded frame. For example, a tile can have encoded its position in the original tiled frame prior to processing in respective processors. Based on the determined position the tile can be inserted into the expanded frame.

In step 510, based on the position of the last inserted tile, blank pixels are inserted adjacent to the last inserted tile. As previously described in relation to step 410, blank pixels can be defined in an implementation specific manner to indicate that in the expanded frame, that pixel does not have valid data. According to an embodiment, where each compressed frame comprises tiles from a original tiled frame allocated in a checkerboard pattern to two processors, blank pixels can be allocated to adjacent tiles (i.e., left, right, top, and bottom tiles) of the last allocated tile.

In step 512, it is determined whether the last inserted tile is the last cell in the current frame. If not, steps 506-512 are repeated until all tiles in the current frame are processed. After the last tile of the current frame is inserted into the expanded frame and the corresponding blank pixels are inserted, processing proceeds to step 514.

In step 514, the current expanded frame is combined with the current combined full resolution frame. According to an embodiment, the combination is achieved by adding the current expanded frame to the current combined full resolution frame. Combination by add operation is available because, in embodiments of the present invention, only one expanded frame would have valid pixel data for a particular tile position in the combined full resolution frame.

In step 516 it is determined whether the last compressed frame has been processed. As described above, the original tiled frame currently being processed can have been allocated between multiple processors such that each processor processes a compressed frame. If the last compressed frame has not been processed, then processing is returned to step 504, and step 504-516 are repeated until the last compressed frame is expanded and combined into the full resolution frame. When the last compressed frame is combined into the full resolution frame, the processing of the original tiled frame is complete and a combined full resolution frame has been constructed by combining compressed frames processed individually in respective processors.

Instructions executed by the logic to perform aspects of the present invention can be coded in a variety of programming languages, such as C and C++, Assembly, and/or a hardware description language (HDL) and compiled into object code that can be executed by the logic or other device.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein.

Aspects of the present invention can be stored, in whole or in part, on a computer readable media. The instructions stored on the computer readable media can adapt a processor to perform embodiments of the invention, in whole or in part.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for use in a system for displaying an image frame from a plurality of compressed supertile frames, comprising:

creating, using a control processor, one or more compressed supertile frames from a plurality of tiles read from a system memory, wherein the tile frames correspond to an image to be generated;

processing, using a plurality of graphics processing units, the one or more compressed supertile frames, wherein each graphics processing unit processes the one or more compressed supertile frames allocated to the graphics processing unit;

reading, using a supertile frame combiner, the compressed supertile frames and expanding each of the compressed supertile frames to generate an expanded supertile frame, wherein the expanded supertile frame is generated at each graphics processing unit and the expanded supertile frame is created for each compressed supertile frame and contains blank tiles for one or more tiles for each tile not allocated to the graphics processing unit;

combining, using the supertile frame combiner, the expanded supertile frames to generate an image frame; and displaying the generated image frame on a display.

2. The method of claim 1, further comprising:

determining, using the control processor, a plurality of supertile frames from the plurality of tiles;

assigning, using the control processor, one or more of the supertile frames to each graphics processing unit; and compressing, using the control processor, respective ones of the supertile frames.

3. The method of claim 2, wherein each of the supertile frames comprises non-adjacent tiles of the image frame.

4. The method of claim 3, further comprising:

storing the respective supertile frames in separate graphics processing units.

5. The method of claim 2, wherein the compressing comprises:

storing, for respective ones of the supertile frames, substantially only a set of tiles assigned to the corresponding processor.

6. The method of claim 1, wherein the expanding is performed substantially simultaneously with the combining.

7. The method of claim 1, wherein the combining comprises:

combining the expanded supertile frames using an add operation.

8. A system for displaying an image frame from a plurality of compressed supertile frames of the image frame, comprising:

a control processor configured to create one or more compressed supertile frames from a plurality of tiles read from system memory, wherein the tile frames correspond to an image to be generated;

a plurality of graphics processing units coupled to the control processor, each graphics processing unit configured to process the one or more of the compressed supertile frames, wherein each graphics processing unit processes the one or more compressed supertile frames allocated to the graphics processing unit;

a system memory coupled to the control processor and plurality of graphics processing units;

a supertile frame combiner configured to read the compressed supertile frames, expand each of the compressed supertile frames to generate an expanded supertile frame, wherein the expanded supertile frame is generated at each graphics processing unit and the expanded supertile frame is created for each compressed supertile frame and contains blank tiles for one or more tiles for each tile not allocated to the graphics processing unit and combine the expanded frames to generate an image frame; and a display configured to display the generated image frame.

9. The system of claim 8, further comprising:

the control processor configured to:

determine a plurality of supertile frames from the plurality of tiles;

assign one or more of the supertile frames to each graphics processing unit; and compress respective ones of the supertile frames.

10. The system of claim 9, wherein the compressing comprises storing, for respective ones of the supertile frames, substantially only a set of tiles assigned to the corresponding graphics processing unit.

11. The system of claim 8 wherein each of the supertile frames comprises non-adjacent tiles of the image frame.

12. The system of claim 8 wherein the expanding is performed substantially simultaneously with the combining.

13. A non-transitory computer readable media storing instructions wherein said instructions when executed are adapted to display an image frame from a plurality of compressed supertile frames with a method comprising:

creating one or more compressed supertile frames from a plurality of tiles read from a system memory, wherein the tile frames correspond to an image to be generated;

processing the one or more compressed supertile frames, wherein each graphics processing unit processes the one or more compressed supertile frames allocated to the graphics processing unit;

reading the compressed supertile frames and expanding each of the compressed supertile frames to generate an expanded supertile frame, wherein the expanded supertile frame is generated at each graphics processing unit and the expanded supertile frame is created for each compressed supertile frame and contains blank tiles for one or more tiles for each tile not allocated to the graphics processing unit;

combining the expanded supertile frames to generate an image frame; and displaying the generated image frame on a display.

14. The non-transitory computer readable media of claim 13, the method further comprising:

processing one or more of the compressed supertile frames in each of a plurality of processors.

15. The non-transitory computer readable media of claim 13, the method further comprising:

determining a plurality of supertile frames from the plurality of tiles;

assigning one or more of the supertile frames to each graphics processing unit; and compressing respective ones of the supertile frames.

16. The non-transitory computer readable media of claim 13, wherein each of the supertile frames comprises non-adjacent tiles of the image frame.

* * * * *

UNITED STATES PATENT AND TRADEMARK OFFICE
CERTIFICATE OF CORRECTION

| | | |
|---|---|---|
| PATENT NO. | : 9,064,468 B2 | Page 1 of 1 |
| APPLICATION NO. | : 13/186160 | |
| DATED | : June 23, 2015 | |
| INVENTOR(S) | : David Glen | |

It is certified that error appears in the above-identified patent and that said Letters Patent is hereby corrected as shown below:

ON THE TITLE PAGE

At Item 56 (References Cited), please add "FOREIGN PATENT DOCUMENTS", and insert therefor -- CN   CN 101452690A*   6/2009 --

Signed and Sealed this
Twenty-third Day of February, 2016

Michelle K. Lee
*Director of the United States Patent and Trademark Office*